3,038,525
BAND BUILDING APPARATUS
Harold H. Clark, Cuyahoga Falls, Ohio, assignor to The Goodyear Tire & Rubber Company, Akron, Ohio, a corporation of Ohio
Filed Mar. 1, 1960, Ser. No. 12,169
9 Claims. (Cl. 156—408)

This invention relates to an apparatus for building endless, flexible bands and, more particularly, is concerned with apparatus of this character for building rubberized cord fabric bands adapted to be incorporated into pneumatic tires.

It is the general object of this invention to provide an apparatus employing inextensible belts for building endless bands which is quickly adjustable to build bands of any desired but exact length, and with the apparatus functioning to accurately join together all portions of each band and with the apparatus constructed to permit quick removal of the completed band therefrom. Another object of this invention is to provide an apparatus for building bands in an exact circumferential length, free of folds, wrinkles, and with all the parts of the band being firmly joined together without air pockets.

The foregoing and other objects of this invention will be better understood by reference to the description and the accompanying drawings in which FIG. 1 is a front elevational view of the apparatus in operative position;

Figure 1:
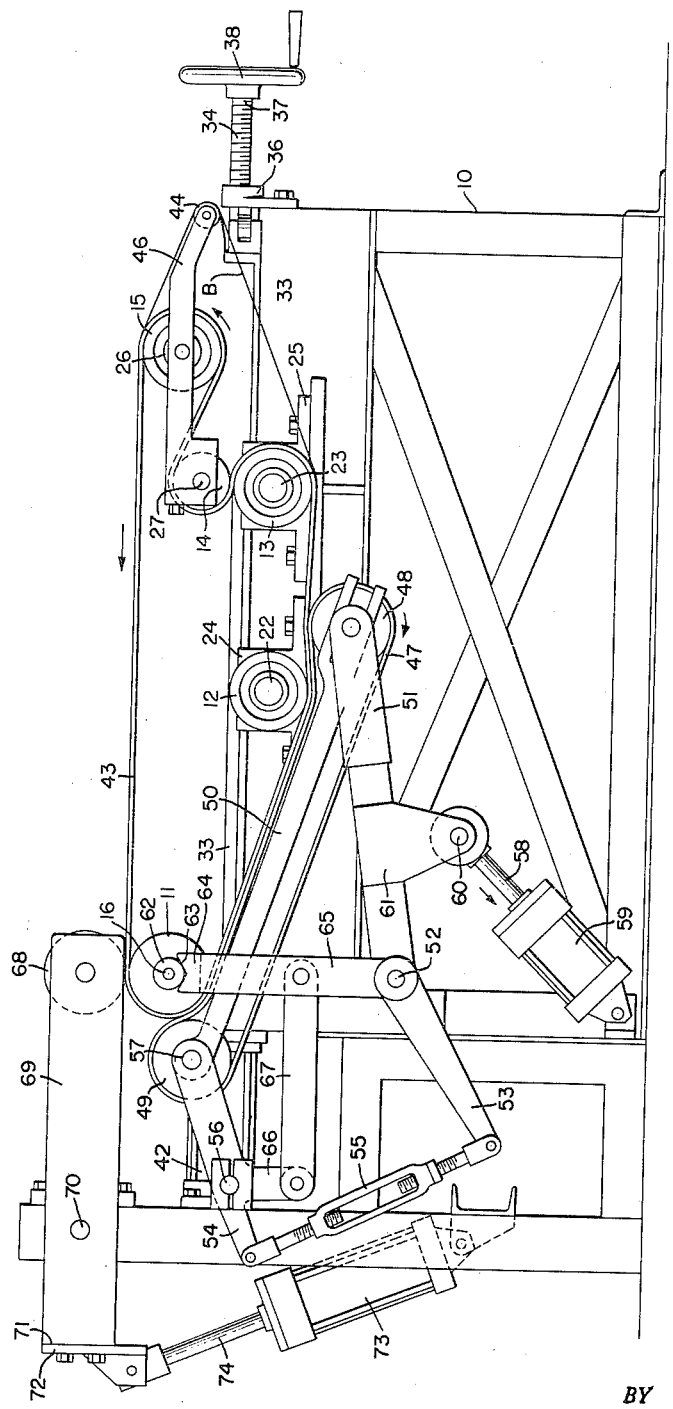
Figure 2:
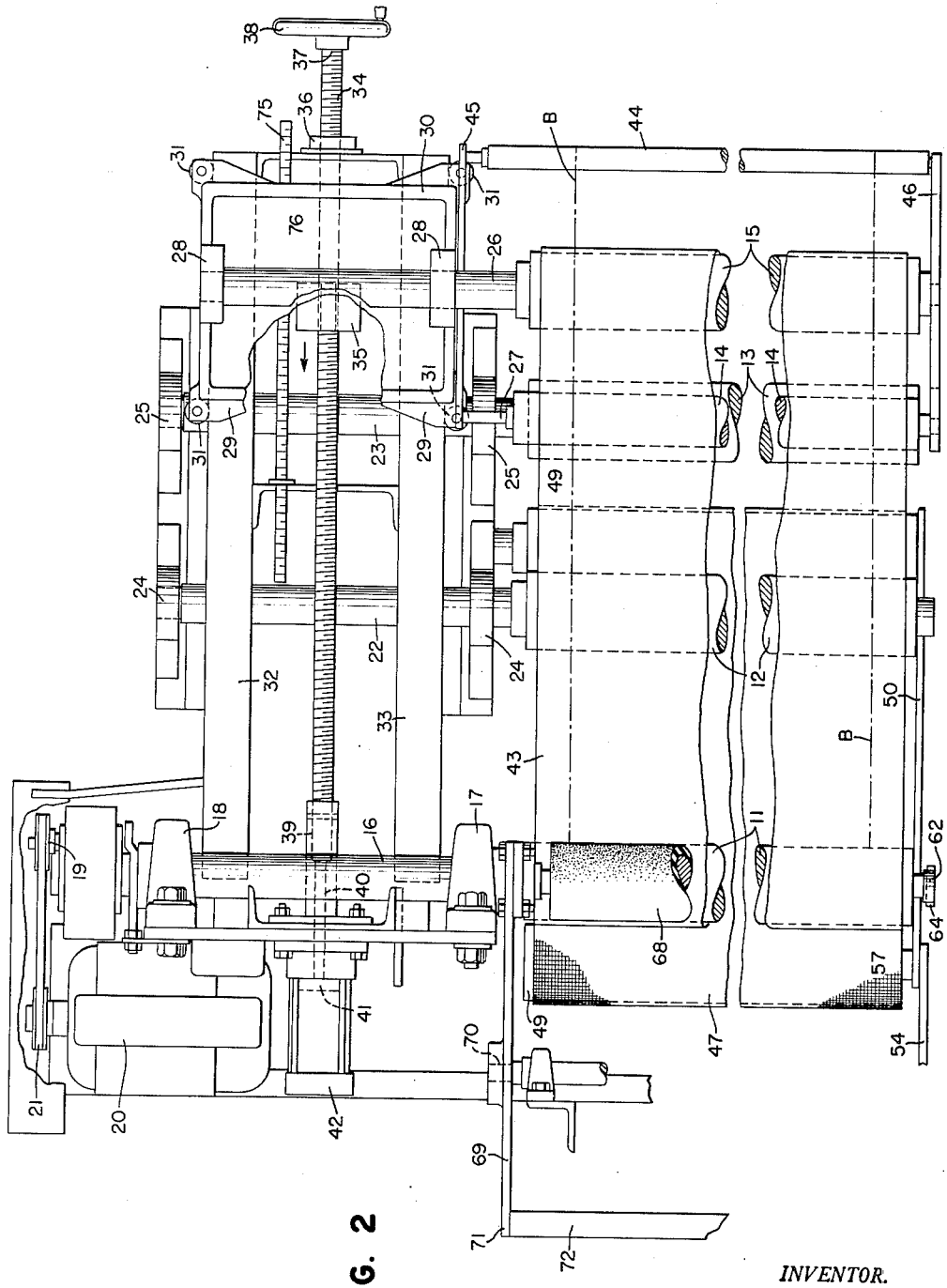
FIG. 2 is a fragmentary plan view of the apparatus with parts broken away and parts in cross section.

In the drawings the numeral 10 indicates a frame from which the ends of a plurality of rollers 11, 12, 13, 14 and 15 are secured in cantilever relationship. The roller 11 is mounted on a shaft 16 rotatable in bearings 17 and 18 supported on the frame 10. The outer end of the shaft 16 is provided with a sprocket 19 driven by the motor 20 through a suitable drive belt 21. The rollers 12 and 13, respectively, are mounted on shafts 22 and 23, rotatable in pairs of bearings 24 and 25. The rollers 14 and 15 are respectively mounted on shafts 26 and 27 rotatable in pairs of bearings 28 and 29 supported on a carriage 30 a fixed distance apart. The carriage 30 is provided with a plurality of anti-friction rollers 31 which engage a pair of slides 32 and 33 on the frame 10 whereby carriage 30 is reciprocally movable relative to the slides 32 and 33.

The position of the carriage 30 is adjusted by means of a screw shaft 34 which threadedly engages a block 35 secured to the carriage and a block 36 secured to the frame 10. The end 37 of the screw shaft 34 is provided with suitable hand wheel 38. The end 39 thereof is fixed to a piston rod 40 secured to the piston 41 which is operable within the cylinder 42. The end 39 of the screw shaft 34 is rotatably connected to the rod 40 but is fixed thereto with respect to longitudinal movement. The rollers 11 through 15 cooperate to support an endless inextensible belt 43 which passes around all the rollers 11 through 15 in the same direction except roll 14. The belt 43 passes around the roller 14 in an opposite direction to that of the other rollers.

The belt 43 serves as the support on which the band built by the apparatus is constructed. In the drawings, the letter B has been used to indicate the band built on the apparatus. Preferably the band B is not supported with its entire periphery in engagement with the belt 43. A separate roller 44 mounted for rotation on the bracket 45, secured to the carriage 30, and a bracket 46 which is secured to the outboard ends of the rollers 10, 14 and 15. The band B is trained around the roller 44 and is thus separated from the belt 43 in the region of the roller 44.

Figure 4:
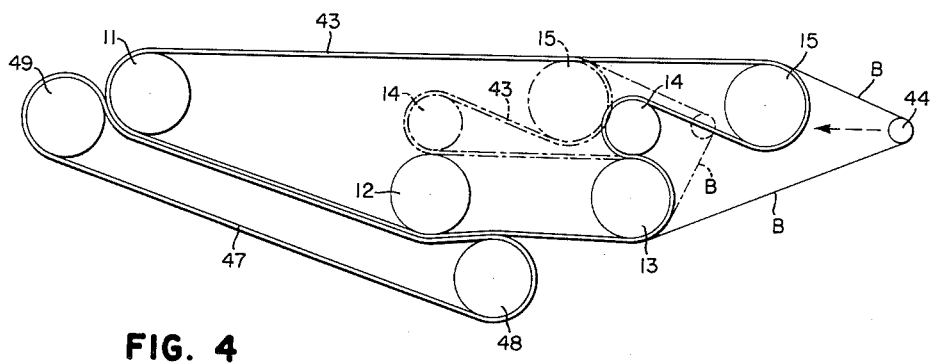
FIG. 4 is a schematic view similar to FIG. 3 showing the minimum and maximum adjustable positions of the apparatus.

From the foregoing it is seen that bands having various circumferential lengths can be readily built on the apparatus. As shown in FIG. 4 of the drawings the length of the band built on the apparatus is determined by the distance around the rolls 44, 15, 11, 12 and 13. Bands of maximum length are built on the apparatus with the rolls 14, 15, and 44 in the position shown in solid lines in FIG. 4, and bands of minimum length are built with the said rolls in the position shown in dotted lines in FIG. 4. As indicated above, the rolls 14 and 15 are moved between the two extreme positions shown in FIG. 4 by adjusting the position of the carriage 30 by means of the hand wheel 38. During such movement it is seen that the extensible belt 43 remains under constant tension and is entrained around the various rolls in a manner such that all of the rolls rotate in the same direction excepting the roll 14. As the carriage 30 is adjusted the length of belt between rolls 13 and 14 increases as the length of belt between rolls 11 and 15 decreases, and vice versa the increase being equal to the decrease because the said lengths or stretches of belt are parallel.

Associated with the belt 44 is a second endless belt 47 entrained around a pair of rollers 48 and 49. The roller 48 is maintained a fixed distance from the roller 49 by a member 50 which is supported at one end by a link 51 pivotably mounted at 52. An arm 53 is fixed to the link 51 and connected to an arm 54 by the adjustable link 55. The arm 54 is pivotably supported at 56 and is connected to the roller 49 at 57. The piston rod 58 of cylinder 59 is pivotably supported at 60 to a bracket 61 connected to the arm 51. Actuation of the cylinder 59 in the direction of the arrow shown in FIG. 1 rotates the arm 51 clockwise about the pivot 52 and simultaneously through the above described links and causes the arm 54 to likewise rotate about the pivot 56 whereby the rollers 48 and 49, which are respectively connected thereto move from the position shown in FIG. 1 to the position shown in FIG. 3 wherein the belt 47 is in non-cooperative position with the belt 43.

The outer end of roller 11 as shown in FIG. 1 is provided with a rotatable roll 62 which rests in a V-shaped notch 63 provided in the end 64 of arm 65 which is pivotably supported at 52. The arm 65 is connected to a link 66 by a link 67. As the cylinder 59 is actuated in the manner described above the link 66 rotates clockwise around the pivot 56 whereby the arm 65 is rotated counter-clockwise around the pivot 52 and is moved thereby to the position shown in FIG. 3.

After the band B has been built upon the belt 43 it is advantageous to firmly stitch all the several plies of the band B together. A stitching roller 68 is rotatably supported at each end thereof on beams 69 pivoted at 70 to the frame 10. The ends 71 of the beams 69 are connected by a cross member 72 which is in turn connected to a cylinder 73 through piston rod 74. Actuation of the cylinder 73 causes the beams 69 to rotate counter-clockwise around the pivot 70 to thus raise the roller 68 under contact with the band B.

Those skilled in the art may readily provide suitable controls for effecting operation of the band building apparatus and its components in the desired sequence and by its relation, therefore no such control elements have been herein illustrated. Control levers, pedals, and the like, may be provided where necessary to control the energization of the motor 20 and to energize solenoid valves, limit switches, or the like to admit or vent air under pressure from within the various actuating cylinders 42, 59 and 73. These controls are within the realm of erection by skilled mechanics and no invention is seen in using any of a variety of forms thereof which may be employed to accomplish the desired functions and the desired sequence as described herein.

Prior to building a band B the operator first adjusts the position of the carriage 30 and its associated rollers 14 and 15 so that the band built on the apparatus will be of the proper and exact circumferential length. The adjustment of the position of the rollers 14 and 15, which are supported a fixed distance apart is, of course, controlled by the rotation of the hand crank 38 which as described positions the carriage 30 at the desired location. The exact size of the band which can then be built on the apparatus will be indicated on the scale 75 by the pointer 76, the scale 75 being appropriately calibrated. Thereafter a ply, or length of band forming material, is fed to the apparatus from the right-hand side of the apparatus as viewed in FIGS. 1 through 4. The ply of material is guided over the top of the belt 43 and the operator then energizes the motor 20 to drive the belt 43 in the direction shown by arrows in FIG. 1. The end of the ply material is carried around the belt 43 down between the belt 43 and belt 47 and is fed out by the belts at which point the operator catches the end of the ply material and folds it back over the roller 44. The operator then joins the two ends of the ply material to form the first ply of the band B. After the ply has been joined end to end the operator usually runs the first ply thus assembled several times around on the belt 43 so that he can see that the band is free from wrinkles and position the splice at a point remote from the splice of the next ply which will be built into the band. The cooperating action of the belts 43 and 47 is such that the first ply and any ply material built into the band is substantially free from wrinkles and the like. With the first ply of material positioned so that its splice is towards the far end of the belt 47 a second ply of material is built onto the first ply in substantially identical manner to that already described. In this fashion any additional number of plies can be built into the band in a relatively rapid and efficient manner.

Figure 3:
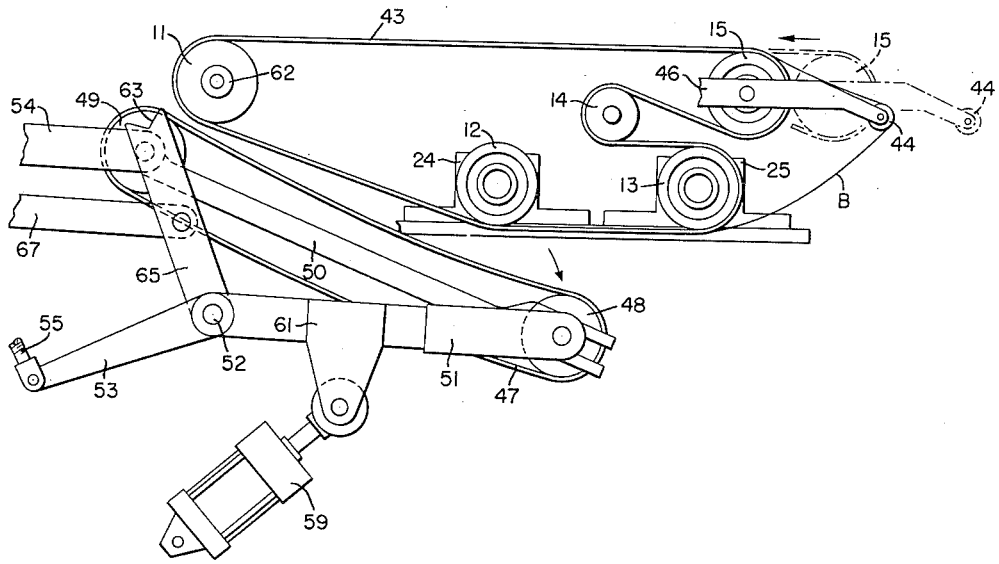
FIG. 3 is a fragmentary view similar to FIG. 1 showing the apparatus in inoperative position.

Once the various plies have been built into the band, the cylinder 73 is actuated to lower the stitching roller 68 into engagement with the band. The motor 20 is also actuated to rotate the belt 43 and the band B beneath the stitching roller 68 to effect a positive and satisfactory stitching of the various plies. The cylinder 59 is then actuated in a direction shown by arrows in FIG. 1 to cause the rollers 49 and 48, the support 65, and the lower belt 47 to be moved into the inoperative position shown in FIG. 3. At the same time the cylinder 42 is actuated which moves the carriage 30 through the screw shaft 34 in a direction shown by the arrows in FIG. 2 which in turn moves the rollers 14, 15, and 44, in a direction shown in FIG. 3 of the drawings, a distance equal to the stroke of the piston 41 whereby the circumferential length around the belt 43 and roller 44 is substantially reduced, as shown in FIG. 3, so that the band B may be easily removed from the apparatus by merely slipping the belt axially of the roller supporting the belt 43 and endwise of the belt 43. After the band B has been removed from the apparatus the cylinder 42 is actuated to again position the carriage 30 and rollers 14 and 15 supported thereon into its adjusted position so that the construction of the next band can be initiated.

From the foregoing it will be recognized that the various objects of my invention have been achieved by the provision of improved apparatus for building endless bands of ply material which is relatively inexpensive and easily operated to rapidly and efficiently produce high quality bands of exact but in a desired length.

While certain representative embodiments and details have been shown for the purpose of illustrating the invention, it will be apparent to those skilled in this art that various changes and modifications may be made therein without departing from the spirit or scope of the invention.

What is claimed is:

1. An apparatus for building bands for pneumatic tires comprising first and second endless belts, said first belt being inextensible and supported on at least four parallel rotatable shafts, means for supporting said second belt so that unsupported stretches thereof are in opposed relationship, means for moving the supporting means for said second belt to move it into engagement with said first belt, and means for rotatably driving at least one of said shafts, at least two of said shafts being simultaneously movable relative to the other shafts and one of said two movable shafts being driven by said first belt in a direction opposite to the other of said two movable shafts whereby the circumferential length around said first belt may be varied.

2. An apparatus for building bands for pneumatic tires comprising a pair of endless belts, means for effecting relative movement between the supports and the belts to position the belts in cooperative relationship with each other or in non-cooperative relationship with each other, one of said belts being inextensible and supported by at least four parallel rotatable shafts, one of said shafts being driven by said one belt in a direction opposite to that of the other three shafts supporting said one belt, said oppositely driven shaft being supported a fixed distance from one of said shafts and means for simultaneously moving said oppositely rotating shaft and said other movable shaft relative to said other shafts whereby the circumferential length around said one belt may be varied.

3. An apparatus for building bands for pneumatic tires comprising a pair of endless carriers, means for moving at least one of the carriers in an endless path, means for effecting relative movement between the supports for the endless carriers to position the carriers in cooperative relationship with each other or in non-cooperative relationship with each other, one of said carriers comprising an inextensible endless belt, a plurality of parallel rotatable shafts supporting said belt, said belt passing around one of said shafts in a direction opposite to its passage around said other shafts, and means for simultaneously moving said one shaft and one of said other shafts relative to the remaining shafts.

4. An apparatus as claimed in claim 3 in which one of said remaining shafts is positioned below a stitching roller, said one remaining shaft having a movable support at one end thereof and means for moving said support when said belts are moved in non-cooperative relationship.

5. An apparatus as claimed in claim 3 in which said oppositely rotating shaft and said one other shaft are supported upon a carriage and means are provided for adjustably positioning said carriage member relative to said remaining shafts.

6. An apparatus as claimed in claim 5 in which the portion of said belt extending from said oppositely rotating shaft is parallel to the portion of said belt extending from said one other shaft.

7. An apparatus as claimed in claim 5 in which said positioning means comprises a screw shaft threaded to said carriage and means for rotating said shaft.

8. An apparatus as claimed in claim 7 in which means are provided for moving said screw shaft, and in turn said carriage a substantial distance in said plane, whereby the circumferential distance around said rolls is reduced to permit removal of the completed band.

9. An apparatus as claimed in claim 8 in which said means for moving said screw shaft includes a fluid actuated cylinder having a piston connected to said shaft.

References Cited in the file of this patent

UNITED STATES PATENTS

| | | |
|---|---|---|
| 1,582,559 | Thompson | Apr. 27, 1926 |
| 1,723,565 | Little | Aug. 6, 1929 |
| 2,231,853 | Macdonald | Feb. 11, 1941 |
| 2,414,021 | Clark | Jan. 7, 1947 |

FOREIGN PATENTS

| | | |
|---|---|---|
| 663,312 | Great Britain | Dec. 19, 1951 |